United States Patent [19]

Tanabe et al.

[11] Patent Number: 4,633,099

[45] Date of Patent: Dec. 30, 1986

[54] FEEDBACK CIRCUIT FOR A SEMICONDUCTOR ACTIVE ELEMENT SENSOR

[75] Inventors: Masanori Tanabe, Hitachi; Kanji Kawakami, Mito, both of Japan

[73] Assignee: Hitachi, Ltd., Tokyo, Japan

[21] Appl. No.: 554,332

[22] Filed: Nov. 22, 1983

[30] Foreign Application Priority Data

Nov. 24, 1982 [JP] Japan .................. 57-204668

[51] Int. Cl.[4] .................. H03K 3/353; H03K 5/153; H01L 27/20; G01L 1/22
[52] U.S. Cl. .................. 307/308; 307/304; 307/119; 357/26; 328/5; 340/365 C; 340/562; 73/777; 73/780
[58] Field of Search .............. 307/304, 308, 309, 310, 307/311, 116, 119; 328/5; 331/65; 357/26; 73/763, 769, 777, 780; 340/365 C, 562

[56] References Cited

U.S. PATENT DOCUMENTS

| | | | |
|---|---|---|---|
| 3,582,690 | 6/1971 | Yerman | 307/308 |
| 3,609,252 | 9/1971 | Broce | 179/100.41 T |
| 3,749,984 | 7/1973 | Benyon, Jr. et al. | 307/308 X |
| 3,805,096 | 4/1974 | Hamilton, II | 307/308 |
| 3,951,250 | 4/1976 | Pointon et al. | 340/365 C X |
| 4,081,700 | 3/1978 | Hamilton, II | 307/308 |
| 4,173,900 | 11/1979 | Tanabe et al. | 73/777 X |
| 4,205,556 | 6/1980 | Runyan | 73/777 X |
| 4,257,117 | 3/1981 | Besson | 340/365 C X |
| 4,263,659 | 4/1981 | Hirata et al. | 340/365 C X |
| 4,275,406 | 6/1981 | Müller et al. | 357/26 |
| 4,314,226 | 2/1982 | Oguro et al. | 357/26 X |
| 4,378,578 | 3/1983 | Bennett | 357/26 X |
| 4,511,878 | 4/1985 | Shimada et al. | 73/777 X |

FOREIGN PATENT DOCUMENTS 7699 6/1979 Japan .................. 307/308

OTHER PUBLICATIONS

Dorey, "A High Sensitivity Semiconductor Strain Sensitive Circuit", Solid State Electronics, vol. 18, pp. 295-299, Jun. 7, 1983.

Manell, "CMOS Inverters Implement Finger Touch ON-OFF", EDN Magazine, p. 90, Jan. 5, 1978.

Fink et al, Electronics Engineers' Handbook, pp. 16-15 through 16-18, 1982.

Primary Examiner—Stanley D. Miller
Assistant Examiner—David R. Bertelson
Attorney, Agent, or Firm—Antonelli, Terry & Wands

[57] ABSTRACT

The drain voltage of an IGFET having a channel responsive to the change in physical quantity to be measured is negatively fed back to the gate terminal of the IGFET. The negative feedback loop includes series connection of a first amplifier having an amplification factor larger than unity and a second amplifier having an amplification factor smaller than unity. The interconnection point between the first and the second amplifiers is connected to the output terminal. There is provided a stable, highly sensitive and highly reliable semiconductor sensor.

5 Claims, 11 Drawing Figures

FEEDBACK CIRCUIT FOR A SEMICONDUCTOR ACTIVE ELEMENT SENSOR

The present invention relates to a semiconductor sensor and in particular to a feedback circuit for a semiconductor sensor having a voltage-controlled semiconductor active element.

Various types of semiconductor sensors are known. A pressure or strain sensor comprising an insulated-gate (IG or MOS) active element and utilizing the piezoresistive effect is proposed in Solid State Electronics, vol. 18, 1975, p.p. 295 to 299. That paper discloses a bridge circuit comprising four metal-oxide-semiconductor field-effect-transistors (MOS FET's), a differential amplifier comprising two MOS FET's and so on. A strain gauge comprising a bridge circuit composed of four IG FET's is proposed in Japanese Patent Application Laid-Open No. 7699/80 which corresponds to U.S. patent application Ser. No. 920,137 filed on June 28, 1978. Characteristics adjustment according to the species of diffusion impurities and the diffusion temperature is also implied. In addition, an IG FET utilizing the piezoresistive effect is disclosed in U.S. Pat. No. 3,609,252, for example. In all of the conventional sensors, however, pressure or the like is applied to a MOS FET with a constant gate voltage applied thereto. The resultant change in the drain current is detected to measure the quantity to be detected such as pressure. That is to say, a physical quantity is measured in an open loop state, resulting in low stability and reliability in measurement. Due to change in the drain current, the operation speed is restricted. In addition, the dissipated power is varied. Accordingly, the quantity of generated heat and the characteristics of the semiconductor sensor are also changed.

Therefore, a semiconductor sensor which is more stable, highly reliable, highly sensitive and operable at high speed has been demanded.

An object of the present invention is to provide a stable and highly sensitive semiconductor active element sensor having a negative feedback loop. To attain this and other objects, the semiconductor active element may be formed by an insulated-gate field effect transistor (IG FET) having a channel structure responsive to a physical quantity to be measured. The drain voltage of the IG FET is negatively fed back to the gate thereof to provide a nearly constant drain current through the IG FET. The stabilized drain current eliminates charging and discharging of the stray capacitance existing in the main current path, facilitating fast operation. Because of the stabilized drain current, the bias condition of the IG FET, and hence the power dissipation of the sensor are also stabilized. Therefore, the quantity of generated heat and hence the characteristics of the sensor are thermally stabilized.

Another object of the present invention is to provide a semiconductor active element sensor comprising an insulated-gate field effect transistor (IG FET), a first amplifying means which is connected between the drain of the IG FET and the output terminal and has an amplification factor larger than unity, and a second amplifying means which is connected between the output terminal and the gate of the IG FET. The amplification factor of the first amplifying means is increased to provide a large output voltage. The amplification factor of the second amplifying means is adjusted to feed a stable bias to the gate of the IG FET. A capacitor for coupling the gate of the IG FET to the source thereof may be placed in the second amplifying means so that a stable DC bias may be applied to the gate of the IG FET and the AC change in a physical quantity to be measured may also be detected with high fidelity.

Other objects, features and advantages of the present invention will be better understood and appreciated from the following description of embodiments taken in conjunction with drawings.

Embodiments of the present invention will now be described by referring to drawings.

Figure 1:
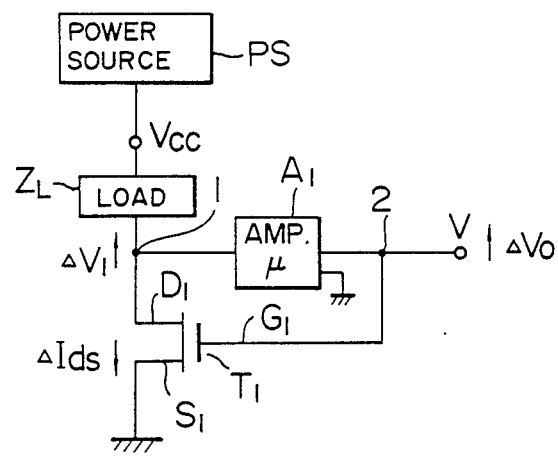
FIG. 1 is a circuit diagram for illustrating an embodiment of the present invention.

FIG. 1 shows an embodiment of the present invention.

In FIG. 1, a fixed load impedance $Z_L$ and a voltage amplifying circuit $A_1$ are connected to a drain $D_1$ terminal 1 of a MOS FET $T_1$. The power supply voltage Vcc from the power source circuit PS is applied to the load impedance $Z_L$. The gate $G_1$ of the MOS FET $T_1$ as well as the output terminal V are connected to the output 2 of the amplifying circuit $A_1$. The source terminal $S_1$ of the MOS FET $T_1$ is connected to the ground. The voltage gain of the amplifying circuit $A_1$ is $\mu$. In addition, the MOS FET $T_1$, i.e. the channel thereof, has a pressure sensitive amplifying function.

In this embodiment, the drain current variation $\Delta V_1$ caused by the pressure applied onto the MOS FET $T_1$ is fed back to the gate terminal $G_1$ of the MOS FET $T_1$ via the amplifying circuit $A_1$ having an amplification ratio $\mu$, a feedback quantity $\Delta V_0 (=\mu \Delta V_1)$ being the change in the output voltage corresponding to the change in the applied pressure. The quantity of change $\Delta V_g = \Delta V_0$ in the gate bias serves to change the drain current $I_{ds}$ toward its original value. When the drain current $I_{ds}$ approaches its original value, the feedback quantity of the gate bias is decreased. The feedback quantity is stabilized at a point where the difference between the change in the drain current caused by the pressure and the change in the drain current caused by the negative feedback balances with the resultant gate bias.

Figure 2:
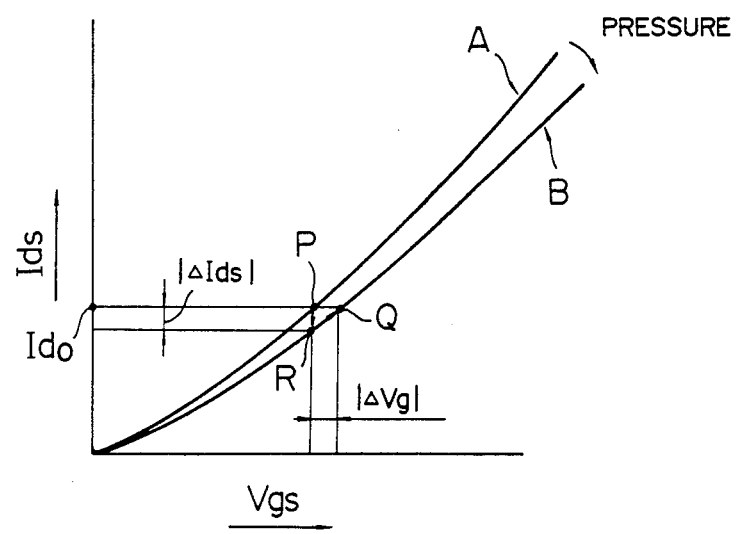
FIG. 2 shows the dependence of the characteristics of a MOS FET on the pressure.

FIG. 2 shows an example of relationship between the drain current $I_{ds}$ of a MOS FET illustrated in FIG. 1 and the gate voltage $V_{gs}$ thereof. It is assumed that a MOS FET has an enhancement mode n-channel and is subjected to a compressive stress in parallel with the channel direction. It corresponds to the tensile stress in parallel with a p-channel. Upon application of pressure, a characteristic curve A corresponding to zero applied stress is replaced by a curve B. If the pressure is applied with the constant gate voltage, a point P on the curve A corresponding to a current value $I_{do}$ moves to a point R on the curve B, exhibiting the quantity of change $|\Delta I_{ds(p)}|$. In the circuit of FIG. 1, the change in the drain current is transformed into the change in the drain voltage. The change in the drain voltage is amplified and negatively fed back to the gate $G_1$ of the MOS FET $T_1$. That is to say, the gate voltage is changed so as to cancel the change in the drain current. If the voltage gain $\mu$ is infinitely high, the change in the drain current will be completely canceled.

To restore the drain current to its original value $I_{do}$ by changing the gate voltage, the operation point R must be moved to a point Q along the line B. At this time, the gate voltage changes from $V_g(o)$ to $V_g(p)$. The quantity of change expressed as $\Delta V_g = V_g(p) - V_g(o)$ which corresponds to the strain caused by the applied pressure is fed to the output terminal as the quantity of change $\Delta V_o$ in the output voltage.

Figure 3:
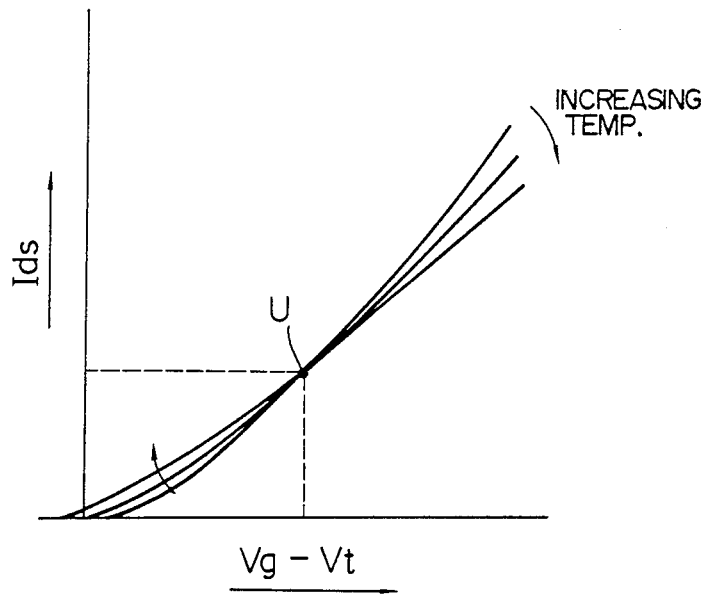
FIG. 3 shows the dependence of the characteristics of a MOS FET on the temperature.

In FIG. 3, the drain current of a MOS FET as a function of the gate voltage thereof is plotted for various temperatures under an identical pressure. In the large current region, the carrier mobility is decreased to decrease the drain current $I_{ds}$ according as the temperature is raised. According as the temperature is raised in the small current region, the drain current $I_{ds}$ increases due to the reduced energy gap (red shift) and increase of thermally excited carriers. Midway between these two regions, there is a region around a point U in which the temperature variation exerts little influence on the drain current. By selecting a drain current value in the vicinity of the point U, a stable sensor which is not affected by the temperature may be realized. If the MOS FET with no stress being applied thereto is biased to a point where the minimum variation in characteristics due to the temperature is caused, the variation in characteristics such as the thermal drift due to the temperature may be substantially made zero at least in the strainless state.

Figure 4:
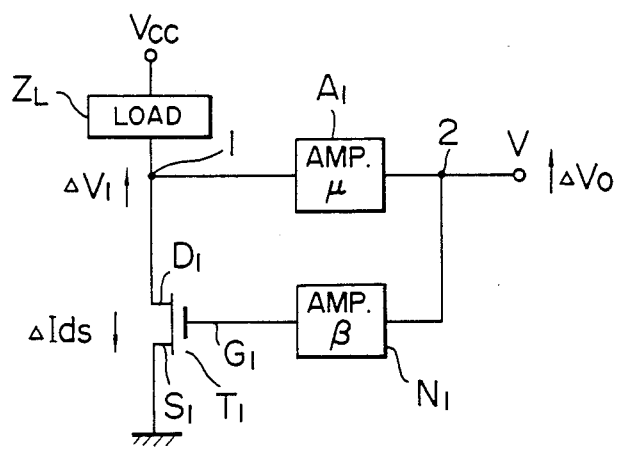
FIG. 4 is a circuit diagram for illustrating another embodiment of the present invention.

FIG. 4 shows another embodiment of the present invention. This embodiment has an advantage that desired magnitude of output voltage may be obtained irrespective of the negative feedback quantity to the gate.

In this embodiment, a first amplifier $A_1$ having an amplification ratio $\mu$ and a second amplifier $N_1$ are connected between the drain terminal $D_1$ of the MOS FET $T_1$ and the gate terminal $G_1$ thereof. The second or the negative feedback amplifier $N_1$ has a voltage gain of $\beta$ which is usually less than unity. In such configuration, the following equations ensure:

$$\Delta V_0 = \mu \cdot \Delta V_1$$

$$\Delta V_g = \beta \cdot \Delta V_0 = \mu \cdot \beta \cdot \Delta V_1.$$

That is to say, the output voltage $\Delta V_0$ is $1/\beta$ times as large as the negative feedback gate bias $\Delta V_g$.

By letting $\mu$ larger than unity and $\beta$ smaller than unity, stable operation with a high output may be realized. In addition, the amplifier $N_1$ may be constituted by using stable passive elements such as resistors and capacitors.

Figure 5:
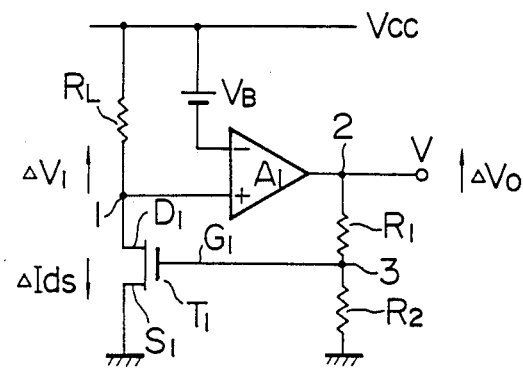
FIGS. 5 to 7 are circuit diagrams for illustrating examples of the embodiment shown in FIG. 4.

FIG. 5 shows an example of the circuit illustrated in FIG. 4. In FIG. 5, the power supply voltage Vcc is fed to the drain terminal $D_1$ of the MOS FET $T_1$ through a resistor $R_L$. The source terminal $S_1$ of the MOS FET $T_1$ is grounded. The noninverting input (+) of an operational amplifier $A_1$ is connected to the drain terminal $D_1$ of the MOS FET $T_1$. A reference voltage source $V_B$ is connected to the inverting input (−) of the operational amplifier $A_1$. The reference voltage source may be formed by a voltage divider circuit composed of diffusion resistors. An output terminal V for the detected value and a resistor $R_1$ are connected to the output terminal 2 of the operational amplifier $A_1$. The gate terminal $G_1$ of the MOS FET $T_1$ is connected to the other terminal 3 of the resistor $R_1$.

The operational amplifier $A_1$ in this example corresponds to the first amplifier $A_1$ illustrated in FIG. 4. The voltage divider circuit composed of resistors $R_1$ and $R_2$ corresponds to the second amplifier $N_1$ illustrated in FIG. 4. The resistors $R_1$ and $R_2$ may be formed by using diffusion resistors or polysilicon resistors on the same semiconductor chip as that of the MOS FET.

Owing to such configuration, the voltage $V_1$ at the drain terminal $D_1$ of the MOS FET $T_1$ is always controlled to be equal to the reference voltage $V_B$ which is coupled to the inverting input terminal (−) of the above described operational amplifier $A_1$. In addition, because of the voltage divider composed of resistors connected to the output terminal of the operational amplifier $A_1$, the output voltage $\Delta V_0$ is obtained as a result of amplification with the ratio expressed as $$(R_1 + R_2)/R_2,$$

facilitating highly sensitive detection.

Figure 6:
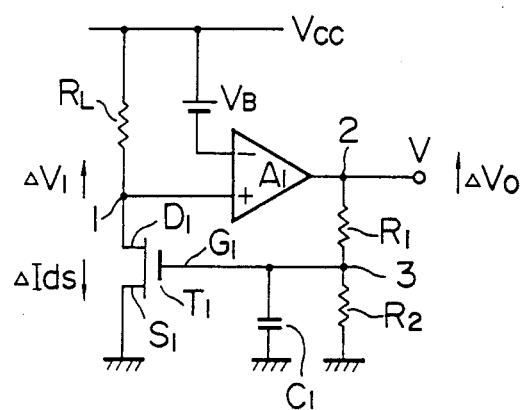

FIG. 6 shows another example of the circuit illustrated in FIG. 4. The circuit of FIG. 6 differs from that of FIG. 5 in that an intermediate coupling point 3 of the voltage divider circuit, i.e., the gate terminal $G_1$ of the MOS FET $T_1$ is connected to the ground via a capacitor $C_1$.

The capacitor $C_1$ serves to eliminate the AC component in the gate bias and to feed back only the DC component to always keep constant the average drain current $I_d$. Since the DC bias level is stabilized by the capacitor $C_1$, the AC change in the quantity to be measured such as vibration may be detected with high precision.

The capacitor $C_1$ may be formed by providing a conductive region such as a doped polysilicon region on a thin insulative film which in turn is placed on a source region or a conductive member region having the same potential as that of the source.

Figure 7:
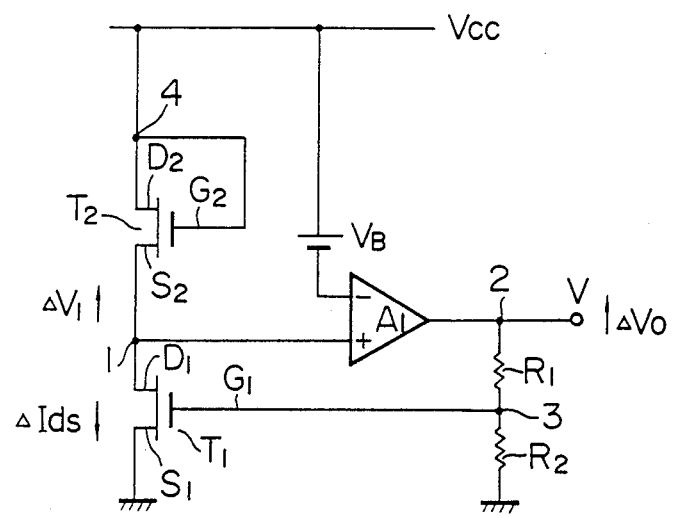

FIG. 7 shows still another example of the circuit illustrated in FIG. 4.

The circuit of FIG. 7 differs from that of FIG. 5 in that the resistor $R_L$ in FIG. 5 is eliminated and a MOS field effect transistor $T_2$ is inserted in the circuit. In an integrated circuit, the required occupation area may be greatly reduced by using a MOS field effect transistor instead of diffusion resistors, the chip size being reduced. Further, if the driver transistor $T_1$ is configured to exhibit a piezoresistive effect which is different from that of the load transistor $T_2$ for the same pressure, the sensitivity may be increased correspondingly. That is to say, if the MOS FET $T_1$ and the MOS FET $T_2$ are arranged on a $S_i$ diaphragm so that drain currents will change in directions opposing to each other upon pressure application (or so that the tensile stress and compressive stress will be incurred or so that the stress which is in parallel with the current channel and the stress which is perpendicular to the current channel will be incurred), the sensitivity may be increased correspondingly.

The MOS FET $T_2$ having a gate directly coupled to the drain and serving as a load may be replaced by another kind of transistor.

Figure 8:
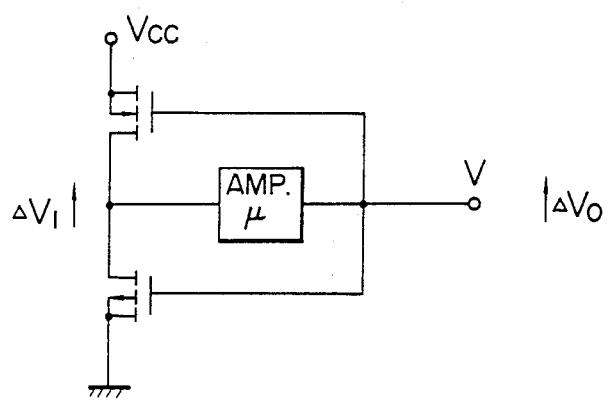
FIG. 8 is a circuit diagram for illustrating still another embodiment of the present invention.

In FIG. 8, instead of the transistor $T_2$ illustrated in FIG. 7, a MOS field effect transistor having a conductivity type opposite to that of the driver transistor $T_1$ is connected to the drive transistor $T_1$ to form a pair of complementary transistors. The output voltage V is negatively fed back to gates of the above described two transistors to control the gate biases. As is well known, such a configuration provides a highly sensitive sensor which can be driven with extremely low power dissipation. If the complementary configuration is applied to a pressure sensor as described in FIG. 7, it is possible to use different piezoresistive effects of the n channel and p channel as they are without any contrivance. As a result, a highly sensitive sensor or a sensor with high precision may be easily realized.

Figure 9A:
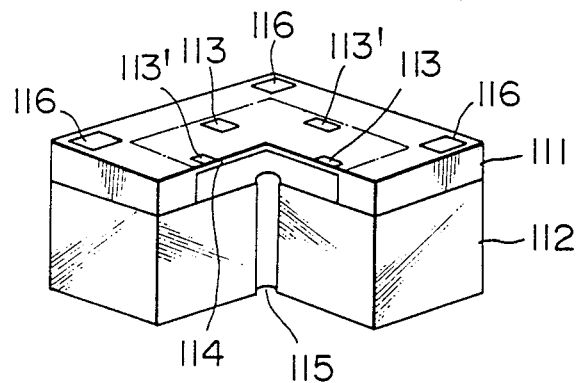
FIGS. 9A to 9C are respectively a perspective view, a top view, and a sectional view for illustrating an embodiment of a pressure sensor according to the present invention.
Figure 9B:
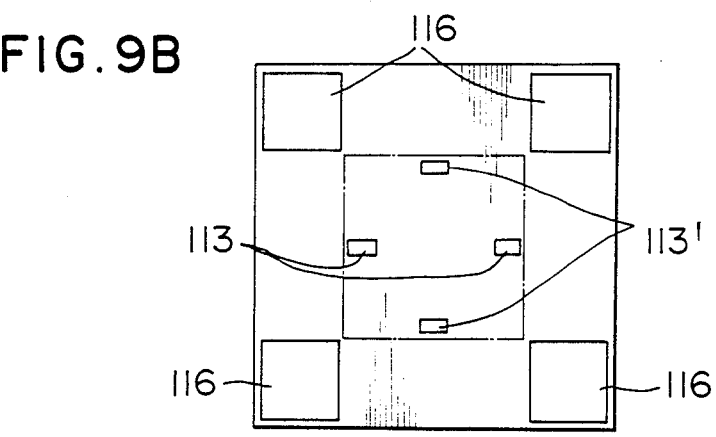
Figure 9C:
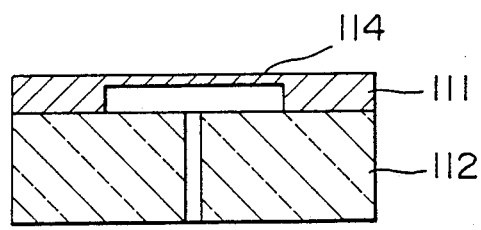

FIGS. 9A to 9C show an embodiment of structure of a pressure sensor according to the present invention. Reference numeral 111 denotes a Si monocrystalline substrate and 112 denotes a borosilicate glass die. The central part of the Si monocrystalline substrate 111 is worked from its rear side to form a thin diaphragm 114. Borosilicate glass has a thermal expansion coefficient close to that of Si and is effective to realize stable operation of the sensor against the temperature change. In addition, the substrate 111 and the glass die 112 are firmly bound together by using the anodic bonding method, for example. At the central part of the glass die 112, a through hole 115 is provided. The pressure to be measured is applied via the through hole 115. On the upper surface of the above described thin diaphragm 114, MOS field effect transistors 113 and 113' are formed by using the IC technology. According to the applied pressure, the diaphragm 114 is deformed to apply stress upon MOS field effect transistors 113 and 113', forming a sensor, i.e. to the channel thereof. The FET 113 has a channel which is perpendicular to the edge of the diaphragm. The FET 113' has a channel which is in parallel to the edge of the diaphragm. Therefore the output voltage produced by the FET 113 for a pressure and that produced by the FET 113' for the same pressure change in opposing directions. Reference numeral 116 denotes a signal processing circuit including the above described operational amplifier and the voltage divider composed of resistors. By simultaneously forming the signal processing circuits 116 on the rigid portion of the Si substrate 111, a pressure sensor composed of a MOS IC may be realized.

Heretofore, the present invention has been described by referring to embodiments of a pressure sensor. However, the present invention is not restricted to pressure sensors. The present invention may be applied to various sensors by forming a functional thin film on the gate electrode portion of the MOS structure. That is to say, a humidity sensor may be realized by using an organic polymer as the functional thin film. A gas sensor may be realized by using Pt, Pd or the like as the functional thin film. In the same way, an ion (H+, Na+, K+ or the like) sensor and a strain sensor may be realized respectively by using $Si_3N_4$ or the like and a piezoelectric film composed of ZnO or the like respectively as the functional thin film.

We claim:

1. A semiconductor sensor comprising:
   a main FET having a channel responsive to a change in physical quantity to be detected, wherein said physical quantity is a quantity representing mechanical variation;
   impedance means which is connected in series with said main FET to form the load thereof;
   negative feedback means for negatively feeding back the change in potential at a connection point where said main FET is coupled to said impedance means to the gate of said main FET; and
   an output terminal for receiving an output signal based upon said potential change fed from said negative feedback means,
   wherein said main FET is an insulated-gate FET and said negative feedback means includes first amplifying means having a voltage amplification factor larger than unity, said output signal being obtained by amplifying said potential change,
   further wherein said load is an insulated-gate FET having a conductivity type which is different from that of said main FET,
   and further wherein said insulated-gate FET constituting said main FET and said insulated-gate FET constituting said load are coupled to have their source and drains connected in series with one another between first and second predetermined potentials, and wherein said first amplifying means is coupled to feed back the change in potential at said connection point of said FETs to the gates of both the main FET and the insulated-gate FET constituting the load.

2. A semiconductor sensor according to claim 1, wherein said sensor is formed on a semiconductor substrate having a diaphragm portion, wherein said main FET is formed in said diaphragm portion so that its channel will be responsive to deformations of said diaphragm portion.

3. A semiconductor sensor according to claim 2, wherein said negative feedback means is formed in a different portion of said substrate away from said diaphragm portion.

4. A semiconductor sensor according to claim 2, wherein said semiconductor substrate is formed on a mounting substrate so that a portion of said substrate is bonded to the mounting substrate and said diaphragm portion is separated from said mounting substrate, and said mounting substrate includes a through-hole for permitting pressure to be applied to said diaphragm portion.

5. A semiconductor sensor according to claim 2, wherein a plurality of said semiconductor sensors are provided on said substrate, including a first group of main FETs having their channels perpendicular to an edge of said diaphragm and are adjacent to the channels of a second group of main FETs which are parallel to an edge of said diaphragm.

* * * * *